Figure 1:
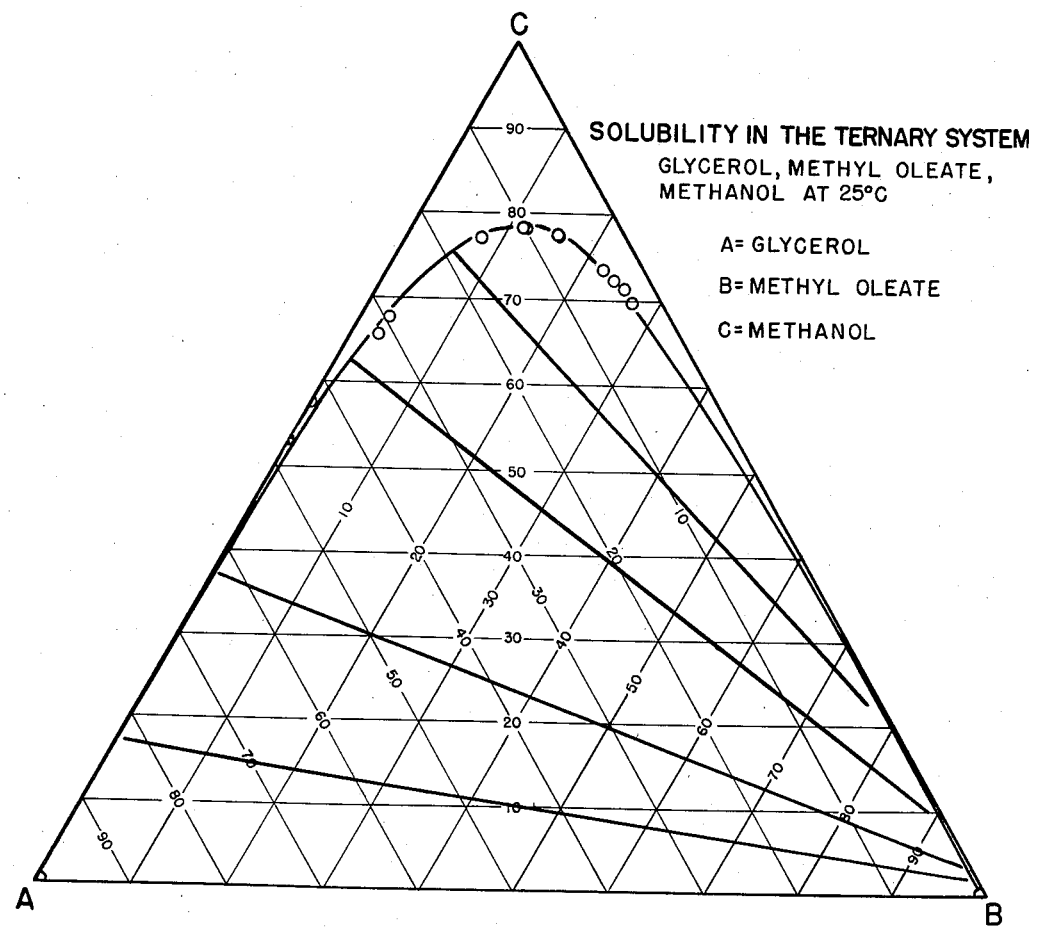
Figure 2:
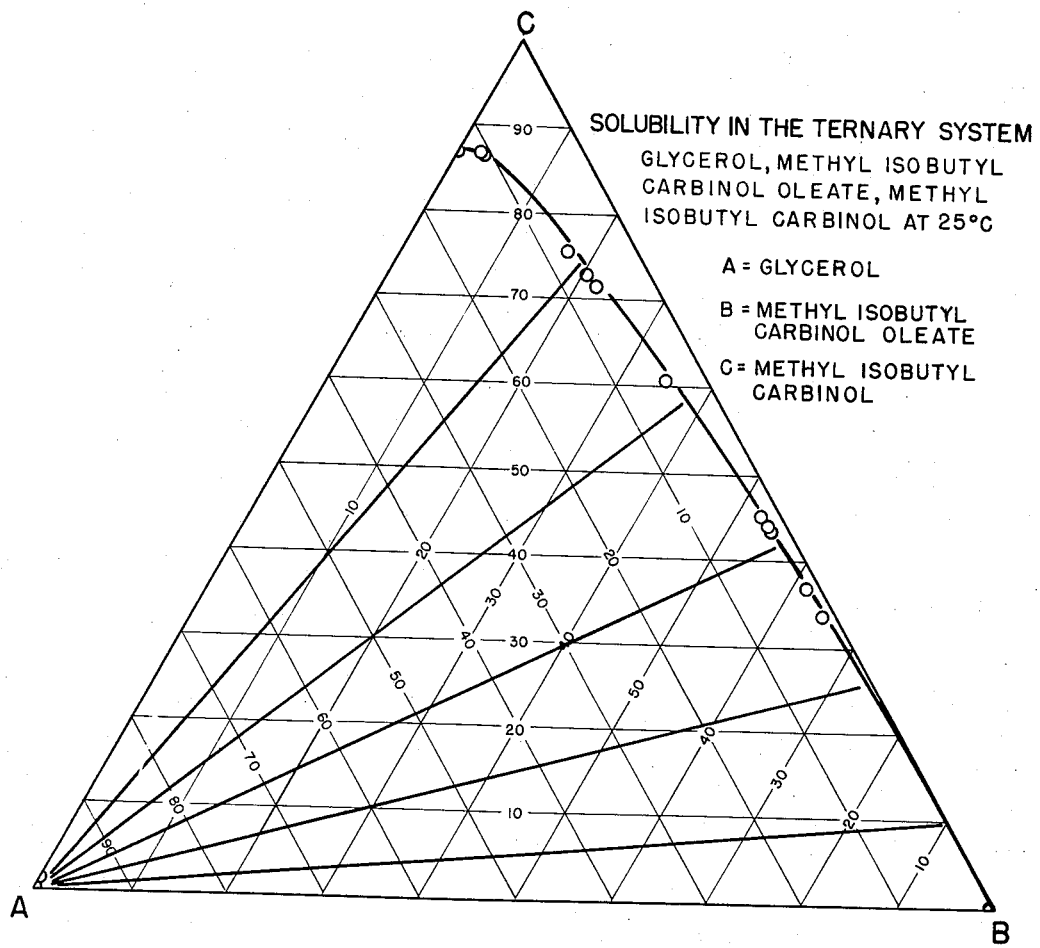

FIGURE I

United States Patent Office 2,865,968
Patented Dec. 23, 1958

2,865,968

PRODUCTION OF FATTY ALCOHOLS

Virgil L. Hansley and Stuart Schott, Cincinnati, Ohio, and Raymond Wynkoop, Metuchen, N. J., assignors to National Distillers and Chemical Corporation, New York, N. Y., a corporation of Virginia Application May 6, 1955, Serial No. 506,463

9 Claims. (Cl. 260—635)

This invention is broadly related to the use of sodium for reduction of fatty acids and fatty acid esters to yield the fatty alcohols, and more specifically to improvements in the process whereby a combination of novel features are incorporated into an integrated process for production of fatty alcohols by sodium reduction, said process being especially adapted for continuous or semi-continuous operations. Low grade fats and free fatty acids and mixtures thereof are converted to low molecular weight esters with acidic catalysts, subjected to ester interchange with a reducing alcohol such as methyl isobutyl carbinol, using basic catalysts to yield directly a satisfactory feed material for subsequent sodium reduction.

The sodium reduction process for producing fatty alcohols was first carried out by the direct reduction with sodium metal in the presence of a reducing alcohol, of the fatty acid esters of glycerol, the most commonly occurring constituents of fats and oils. However, because of the necessary recovery of the by-product glycerol, the glyceride reduction was useful only to those industrial installations which could recover the glycerine in the caustic soda-glycerin by-product solution by utilizing the by-product caustic soda as in standard soap making operations. The glycerol from the sodium reduction was recovered together with that from the subsequent saponification reaction of the caustic soda on the glyceride. This necessity for the recovery of glycerol has further limited the expansion of the sodium reduction process to that amount equal to the caustic soda required by the soap manufacturer.

The reduction of esters of high molecular weight fatty alcohols by reacting the esters with alkali metal and a lower aliphatic alcohol in solution in the lower alcohol is also known. A relatively large excess of the solvent primary alcohol and the alkali metal are required. After completion of reaction, the free alkali metal remaining and the alkali metal compounds produced are decomposed by treating with alcohol and water. The fatty alcohols form a separate organic layer which may be further refined by distillation.

This method gives low yields of fatty alcohol product and poor reduction efficiency. A considerable portion of the alkali metal is used up by the evolution of hydrogen from direct reaction with the solvent alcohol rather than being used to reduce the esters to fatty alcohols.

An improvement was developed wherein a secondary or tertiary alcohol was used as the reducing alcohol in a substantially stoichiometric amount and preferably in conjunction with an inert solvent or diluent employed to keep the reduction mixture fluid. In accordance with this improvement, alkali metal is suspended in a hydrocarbon and the ester to be reduced, together with the reducing alcohol, are added to the alkali metal suspension. In order to insure complete reduction of the ester, excesses of both the alcohol and the alkali metal are used. However, this has resulted in serious difficulties, especially in the reduction of certain esters of higher molecular weight fatty acids. When low grade fats containing free fatty acids or relatively saturated tallows are employed, the process results in considerable amounts of gaseous hydrogen evolved, which constitutes a waste of alkali metal. Also, very stable emulsions are formed during working up of the reaction mixture resulting in prolonged separation difficulties and loss of reactants and products.

An object of this invention is to provide a procedure for using low grade animal and vegetable fats and oils containing free fatty acids, as starting materials for sodium reduction to fatty alcohols.

Another intermediate object involves specifically the conversion of low grade fats containing up to 50% free fatty acids to secondary or tertiary alcohol esters and their reduction in high yields to the corresponding fatty alcohols.

A further, more specific object is the conversion of these low grade fats and the accompanying fatty acids of methyl isobutyl carbinol esters and their subsequent reduction.

A further object is the relatively quantitative recovery of glycerol in a pure useful form. Other advantages of the process will become apparent from the more detailed description hereinafter set forth.

Alcoholysis reactions between glycerides and the lower molecular weight and more chemically active alcohols have been known using both acidic and basic catalyst systems. A disadvantage of alkaline systems, however, for the alcoholysis of fats lies in their inability to effect the simultaneous esterification of any free acids such as are present in low grade fats and oils. On the other hand, processes for the alcoholysis of fats with lower alcohols, using acid catalysts, effect the esterification of free fatty acids, but considerable excess of the alcohol has heretofore been necessary.

Because of the relative inactivity of methyl isobutyl carbinol and similar secondary and tertiary reducing alcohols in esterification reactions (lack of esterification of free fatty acids) and the difficulty of separating glycerol from these reducing alcohols, after the alcoholysis reaction, the glycerides and free acids are initially converted into methyl esters using an acid catalyst and the glycerine resulting from the glycerides separated. Then, methyl isobutyl carbinol or other reducing alcohol is added and the second alcoholysis reaction is effected. To increase rate of this reaction the mixture is made alkaline by the addition of sodium, sodium methoxide, sodium ethoxide or other sodium alkoxide such as that of methyl isobutyl carbinol. The reaction is forced to completion by distilling out the excess methanol from the first esterification step plus the methanol set free in the second reaction. It is desirable to obtain, as a final product an ester-containing mixture having free methyl isobutyl carbinol in the molecular ratio of one mole of ester to two of alcohol which mixture is that required for an ester feed mixture to the next step, the sodium reduction process.

Two related alternate routes to the fatty alcohols can be used in this improved process. One is based on the use of low grade glycerides, containing free acids and the other on pre-split free fatty acids.

I. For instance, a low grade fat containing free fatty acids can be converted to the corresponding fatty alcohols of $C_6$ to $C_{22}$ molecular weight by the following series of reactions. R', R", and R''' may be the same or different radicals having from 11 to 21 carbon atoms and may be either saturated or unsaturated. For simplicity, these reactions are written separately. However, it should be understood that, in a low grade fat or oil, the ester portion of the fat may be present to some extent as a mono- or diglyceride.

1 a 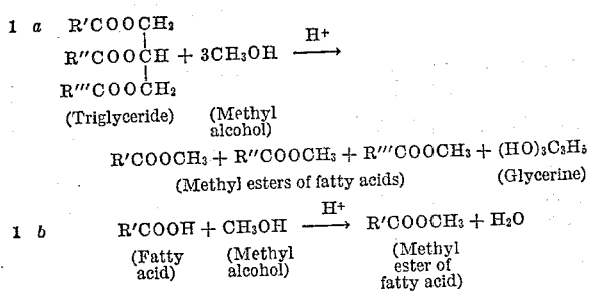

A second alcoholysis reaction is employed to convert these methyl esters to esters of the same type of alcohols as those used for the reducing alcohols.

(2) 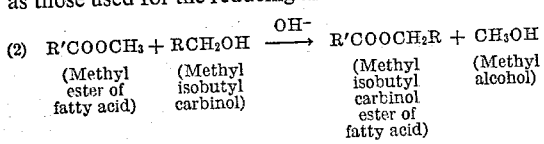

R is preferably the methyl isobutyl radical.

These methyl isobutyl carbinol esters then are reduced with sodium, using methyl isobutyl carbinol, $C_6H_{13}OH$, as the reducing alcohol. This reduction proceeds according to the following equation:

(3) 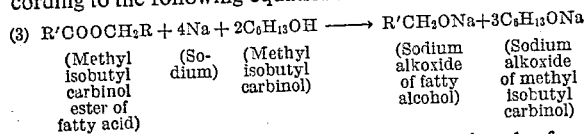

As a final step, hydrolysis is carried out to give the free fatty alcohol and release the methyl isobutyl carbinol.

(4) 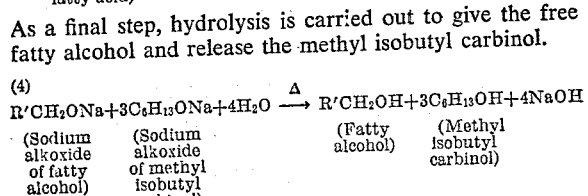

Although in the above sequence of steps, it is theoretically possible to subject the methyl esters of the fatty acids to sodium reduction, this is not practical for a number of reasons. The sodium alkoxides and, in particular, sodium methoxide, produced as the by-products of the sodium reduction have very limited solubility in the hydrocarbon solvents. In general, the sodium alkoxides of the lower molecular weight alcohols, particularly methyl and ethyl, are substantially completely insoluble in the hydrocarbons such as xylene and toluene, while those formed from the higher alcohols and especially those from the branched-chain higher molecular weight alcohols have greater solubilities especially when hot and which increase in proportion to the molecular weights. It is impossible, as a practical matter, to use sufficient hydrocarbon solvent to dissolve all of the alkoxide. When the alkoxide is formed by a reaction of alkali metal with the alcohol in the presence of the hydrocarbon solvent, an insoluble precipitate forms which is more or less gelatinous in nature and thereby increases the viscosity of the mixture. When the alcoholates are formed by reacting sodium with the appropriate alcohol and the ester in substantially the theoretical proportions, the alkoxides produced are in the form of colloidal suspensions, that is, are sols rather than gels and thus increase the viscosity to only a relatively small extent. The formation of sodium methylate in the reaction mixture tends to increase the viscosity of the mixture to a greater extent than does the formation of alcoholates of higher alcohols. Thus smaller amounts of solvent are required in the reduction of, e. g., esters of higher molecular weight alcohols than are required in the reduction of the methyl esters. With regard to the reducing alcohol best used, those of higher molecular weight form alkali metal alkoxides which are somewhat more soluble and dispersable in hydrocarbon solvents than those formed from a lower molecular weight alcohol. The alkali metal compounds of methanol, for example, are highly insoluble in hydrocarbon solvents and for this reason methanol esters are unsuitable for use in this process.

II. As an alternate embodiment of the process, it is quite feasible to split the glyceride by means of superheated steam into glycerine and the free fatty acids according to the equation shown below in which R', R", and R''' may be the same or different radicals having from 11 to 21 carbon atoms and may be either saturated or unsaturated. Such a starting material yields varying mixtures and amounts of $C_6$ to $C_{22}$ fatty alcohols.

(1) 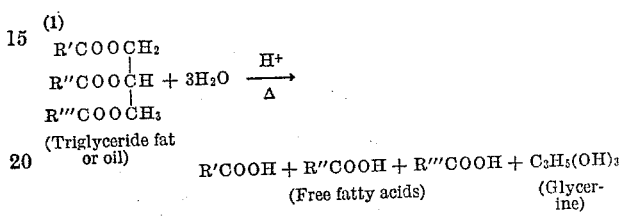

According to this process after separation of the glycerine containing phase the free fatty acids are esterified directly with a higher alcohol which can be and is preferably the same as the alcohol that is used as the reducing alcohol in the reduction step. The ester is thus produced according to the following equation:

(2) 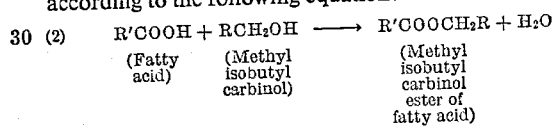

R is preferably the methyl isobutyl radical.

(3 and 4) The reduction and hydrolysis steps are exactly identical as outlined by the equations above, the methyl isobutyl carbinol esters of the fatty acids being the starting material in each instance.

Such preliminary treatment of the glycerides (fats and oils) permits ready and convenient separation of the by-product glycerine prior to the sodium reduction and avoids the difficulties inherent in the problem of separating the valuable glycerine product from the aqueous caustic soda solution obtained in the hydrolysis step.

Since the recovery of glycerine is such an important consideration, a study was made of the relative efficiencies of separation of glycerol on a solubility basis considering the two systems most suitable for sodium reduction.

The two types of esters most likely for use are those from methanol and methyl isobutyl carbinol. Since one of the principal and most typical acids encountered in glycerides is oleic acid, the studies were conducted on systems involving its esters. Thus, phase diagrams were prepared and studied for the systems; glycerol, methyl oleate, and methanol (Figure 1) and glycerol, methyl isobutyl carbinol oleate, and methyl isobutyl carbinol. Solubilities of the components were determined and these results are shown in the following tables.

It should be noted that two different types of systems are involved here. Methanol and methyl oleate are miscible; methanol and glycerol are miscible; and methyl oleate and glycerol are immiscible.

Tie lines for the methanol system (Figure 1) were determined by preparing known mixtures of the three components and allowing the layers to separate at constant temperature. The methanol-rich layers were then assayed for methanol by distillation. The tie lines were drawn from these points through the points of the known mixtures until they intercepted the solubility curve.

On the other hand, the methyl isobutyl carbinol ester and methyl isobutyl carbinol are miscible, the methyl isobutyl carbinol ester and glycerol are immiscible, but glycerol and methyl isobutyl carbinol are only partly soluble. Glycerol dissolves less than 1% methyl isobutyl carbinol, while methyl isobutyl carbinol dissolves about 13% glycerol. The tie-lines for this latter system are very simple, since they have approximately a common origin; hence, they can be drawn by inspection.

The system involving methyl isobutyl carbinol results in the separation of glycerol of 99% purity or better. The glycerol obtained from the methanol system, on the other hand, will contain dissolved methanol which would have to be removed by a further distillation. Thus, the use of the methyl esters is also undesirable from this respect.

SOLUBILITIES IN GLYCEROL-METHYL OLEATE-METHANOL SYSTEM AT 25.0° C.

| Percent Glycerol | Percent Ester | Percent Methanol |
|---|---|---|
| 46.2 | 0.0 | 53.8 |
| 29.0 | 3.1 | 68.0 |
| 14.9 | 7.8 | 77.3 |
| 6.3 | 15.9 | 77.9 |
| 31.2 | 3.0 | 65.9 |
| 2.8 | 27.3 | 70.0 |
| 3.5 | 24.0 | 72.5 |
| 9.4 | 12.0 | 78.6 |
| 6.7 | 15.6 | 77.7 |
| 42.0 | 0.0 | 58.1 |
| 4.0 | 22.1 | 73.9 |
| 9.9 | 11.6 | 78.5 |
| 2.9 | 25.3 | 71.6 |
| 99.8 | 0.2 | 0.0 |
| 0.5 | 99.5 | 0.0 |

TIE LINES IN THE SYSTEM: GLYCEROL-METHYL OLEATE-METHANOL AT 25.0° C.

| Upper Layer | | | Lower Layer | | |
|---|---|---|---|---|---|
| Percent Methanol | Percent Glycerol | Percent Ester | Percent Methanol | Percent Glycerol | Percent Ester |
| 3.5 | 0.5 | 96.0 | 37.2 | 62.5 | 0.27 |
| 9.3 | 0.7 | 90.0 | 62.9 | 35.2 | 1.87 |
| 23.0 | 1.0 | 76.0 | 75.5 | 18.3 | 6.2 |
| 1.5 | 0.5 | 98.0 | 17.1 | 82.7 | 0.18 |

SOLUBILITIES IN GLYCEROL-MIBC-MIBC ESTER OF OLEIC ACID SYSTEM AT 25.0° C.

| Percent Glycerol | Percent Ester | Percent MIBC |
|---|---|---|
| 2.0 | 54.6 | 43.4 |
| 1.2 | 62.1 | 36.8 |
| 10.8 | 2.7 | 86.5 |
| 7.2 | 17.2 | 75.6 |
| 6.5 | 20.5 | 73.0 |
| 6.2 | 22.7 | 71.3 |
| 1.9 | 54.1 | 44.0 |
| 4.2 | 34.9 | 60.8 |
| 2.2 | 52.8 | 45.1 |
| 1.3 | 65.1 | 33.6 |
| 13.3 | 0.0 | 86.7 |
| 98.9 | 0.0 | 1.1 |
| 99.8 | 0.2 | 0.1 |
| 10.9 | 2.1 | 87.0 |
| 0.6 | 99.4 | 0.0 |

The resulting fatty alcohol products produced by this simplified and improved reduction system are subsequently obtained in yields and purity equal to or better than those obtained in previous known reduction systems. Yields of over 90% have been obtained.

This novel process lends itself most favorably to continuous or semi-continuous operation. As will be seen from the description in the examples below, numerous advantages are realized by operation in a continuous manner.

The reaction of alkali metal and the reducing alcohol on the esters can be carried out with substantially no side reactions giving gaseous hydrogen if the ratio between the alcohol and the ester added to the reaction mixture is equal to not more than two moles of alcohol for each mole of ester to be reduced.

Reactants are employed in substantially stoichiometrically equivalent amounts. Thus, there should be used four moles of alkali metal per mole of ester to be reduced.

The fatty acid ester to be reduced is preferably premixed with near the theoretical amount of the reducing alcohol. A suspension or dispersion of finely divided sodium is prepared in a hydrocarbon solvent such as xylene or toluene. There is added to this suspension with efficient agitation, the mixture of the ester to be reduced together with the reducing alcohol in the ratio of 1 mole of ester to 2 moles of the alcohol. This alcohol-ester solution is added slowly with rapid agitation, while the reaction mixture is maintained at the desired reaction temperature. Preferably, the sodium is in a molten condition and will be so at the temperatures employed for reaction. The reducible mixture is added at a rate such that only a low concentration of unreacted esters is present in the reacting mixture at any instant. This is necessary to avoid undesirable side reactions between the alkali metal and the ester.

The temperature of the reaction mixture may vary from temperatures of 30° C. up to the boiling point of the solvent. In most cases the best yields are obtained by using a reaction temperature above the melting point of the alkali metal, that is, between 100 and 110° C. when using sodium as the alkali metal.

The reaction mixture is treated with water, hydrolyzing thereby the various alcoholates to form the corresponding alcohols and sodium hydroxide.

Two phases are formed as a result of the quenching operation, an aqueous phase and a non-aqueous phase. The result is an aqueous phase containing dissolved sodium hydroxide and any dissolved quantities of the reducing alcohol and the solvent used, depending on solubilities, and a non-aqueous phase consisting of fatty alcohol products together with any water insoluble portion of the reducing alcohols and the major portion of the solvent. The non-aqueous phase is conveniently separated and the fatty alcohols separated and purified, for instance, by rectification. Free fatty acids, if present, must be in the form of sodium soaps during distillation of the fatty alcohol product. This assures that the distilled fatty alcohols will be completely acid-free. The recovered solvent and regenerated reducing alcohol are recycled to the process.

Although any of the members of the alkali metal class can be employed as reactants in this invention, it is much preferred to use sodium from the standpoint of economics and availability. Sodium has been employed as a typical alkali metal.

The term "reducing alcohol" is used and is to be understood to mean aliphatic and alicyclic alcohols. These can be branched chain or straight chain monohydric alcohols containing preferably four or more carbon atoms. The boiling point of the reducing alcohol should be such that efficient separation from the product fatty alcohols can be made by distillation. Furthermore, it may be advantageous to use a reducing alcohol that is the same as an alcohol liberated or produced by the reduction reaction of the ester. Generally, secondary alcohols such as methyl isobutyl carbinol, cyclohexanol, methyl cyclohexanol, ethyl methyl carbinol, and amyl methyl carbinol are preferred although the tertiary alcohols, such as tertiary butyl and tertiary amyl alcohol can also be used. Methyl isobutyl carbinol has been used as the typical example.

Various organic liquids, inert to alkali metals and having boiling points sufficiently high to allow their use at the desired reaction temperatures, can be used as solvents or diluents in this process. Examples of suitable solvents are aromatic hydrocarbons such as xylene or toluene and aliphatic hydrocarbons, e. g. petroleum fractions, preferably those high in paraffin hydrocarbons, and ethers, such as dibutyl ether. The solvent liquid should have a boiling point above about 100° C.

Many different kinds of fatty acids derived from naturally occurring fats and oils can be converted to the corresponding fatty alcohols and mixtures of fatty alcohols. These comprise fatty acids of both the saturated and unsaturated types having from 12 to 22 carbon atoms per molecule and fats and oils yielding them. The fatty acids can originally be obtained from coconut oil, palm kernel oil, lard, beef tallow, bayberry tallow, palm oil, cotton seed oil, soy bean oil, corn oil, linseed oil, castor oil, tung oil, menhaden oil, rape-seed oil, olive oil, marine oils, and mixtures of such oils. The fatty acids therefrom can be either saturated or unsaturated and are generally mixtures of the two types. The process is especially well adapted for utilizing the low grade fats containing varying amounts of free fatty acids and mono- and di-glycerides as well as triglycerides. These include such materials as brown greases, mixtures of recovered oils and fats such as garbage greases, low grade tallows and lards, and residues from various commercial fats and oils such as are recovered from the refining of cottonseed oil, linseed oil, and the like.

In this improved reduction process for preparation of higher alcohols from fatty acids and low grade fats, sodium is in the molten state. Reaction takes place at the surface of the sodium droplets since the metal is almost completely insoluble in the organic media present. Sufficient sodium surface to permit the reaction to proceed at a practical rate is therefore important. Optimum reaction rates for the desired reduction process also avoid other reactions which tend to consume reagents to produce unwanted and unprofitable by-products. Since sodium is a liquid in the sodium-ester reduction process, it constitutes a separate liquid phase in contact with the organic liquid media with sodium being the discontinuous phase. However, pure liquids will generally not spontaneously disperse satisfactorily in other pure liquids. In order to assure that the dispersion process proceeds well, an emulsifying agent is preferably present.

Ordinarily, certain compounds occur in sufficient, though minor amounts, in charging stocks as impurities which function as dispersing agents for sodium when naturally occurring fats and oils are used. However, in sodium reduction processes such as are herein described, in which highly refined synthetic esters are used as the charging stock, such natural dispersing agents for sodium are not present. Consequently, the sodium is not dispersed properly in the reduction reaction mixture and the desired sodium reduction reaction is retarded. Polymerization and/or dimerization reactions occur with a resulting lower yield in the desired fatty alcohols product and a corresponding wastage of sodium.

Thus it has been found that, for pure esters as starting materials in the reduction, sodium is not dispersed in reaction mixture sufficiently well to give maximum yields of the corresponding alcohols. As one additional feature of the invention, the incorporation of minor or trace amounts of selected dispersing agents for sodium gives the desired degree of dispersion of sodium in the liquid organic medium.

Dispersing agents for sodium which are suitable are those which do not interfere with the reaction and which will not contaminate the product higher alcohols. These include fatty acids and polymeric aliphatic acids such as dilinoleic acid, etc.

Considerable operational difficulties have frequently been encountered in the isolation step in the sodium reduction of fatty acid esters during washing out strong caustic alkali from the product higher alcohols after hydrolysis of the reduction reaction mixture.

The product fatty alcohols tend to produce undesirable emulsions in the recovery part of the process. These emulsions are the water-in-oil type and are almost impossible to handle when attempts are made to wash out the dissolved and suspended droplets of high strength aqueous caustic soda. The resulting emulsions are almost impossible to break short of partial or total acidification of the entire reaction mass. This procedure is unsound for a number of reasons including the cost of extra reagents, loss of value of neutralized by-product caustic soda, and the incidental introduction, by acidification, of appreciable quantities of free fatty acids into product fatty alcohols.

Another method used to cause the emulsions to break, is to dilute the alkaline, fatty alcohol containing mixture with methyl isobutyl carbinol or another alcohol which is the same as the reducing alcohol employed in the reduction step. This method has also proved to be unsatisfactory since it is sensitive to operate and does not always result in sharp separation of the aqueous caustic soda phase and the organic phases. It is imperative to remove essentially all of the by-product caustic soda from the reduction reaction, since otherwise the remaining caustic soda would hold back, as non-volatile alkoxides, a portion of the higher alcohols.

As another further feature of this invention, these difficulties which are encountered in the sodium reduction of methyl isobutyl carbinol esters of fats and oils and particularly those containing relatively high properties of saturated $C_{16}$ and $C_{18}$ fatty acids, such as hardened tallow, have been overcome. This is accomplished by washing the hydrolysis mixtures from the sodium ester reduction step with dilute caustic soda, rather than water, thereby substantially preventing and avoiding the formation of emulsions. The discovery that the alkalinity of the washing water of these hydrolyzed mixtures is critical and should be in the pH range of 12–14 (N/100 to N/1 $N_aOH$) is of the utmost importance in the sodium reduction process and recovery of products therefrom. Similar good results are obtained with coconut oil reduction mixtures and with oleic acid ester reduction mixtures. Thus, the use of the aqueous washing solutions having controlled and specific pH is applicable to hydrolysis mixtures resulting generally from sodium reductions.

The invention will be further illustrated by the following typical examples although it is in no way intended to limit the scope of the invention thereto. All parts are by weight unless otherwise indicated.

*Example I*

The methyl esters of fatty acids from tallow were prepared by contact with excess methanol in the presence of strong acids such as sulfuric, phosphoric, benzene sulfonic, xylene sulfonic acids, and the like. Water cannot be removed azeotropically because it does not form an azeotrope with methanol. This esterification reaction can be driven to completion by rapidly "blowing" methanol vapor through the esterification solution at an elevated temperature, which process removes the water as fast as it is formed, then fractionating the methanol to remove the water "steamed over" and returning the rectified methanol to the esterification vessel. In this manner, the reaction can be brought to completion in a reasonably short time with only a minor excess of methanol. Free fatty acids, in low grade fats and oils and even in oil refiners "foots" or residues, can be recovered as methyl esters for sodium reduction in this manner.

The next step in the process is the addition of sufficient methyl isobutyl carbinol directly to the ester reaction mixture in the still to produce the esters of the fatty acids and in addition, to provide 2 moles of methyl isobutyl carbinol in excess per mole of ester, i. e. 3 moles of the methyl isobutyl carbinol are added per mole of methyl ester present at this point. It is highly desirable for speed and efficiency of reaction, to change to an alkaline catalyst. Alkaline catalysts function much more rapidly as alcoholysis catalysts. This change is accomplished by the addition of sufficient sodium alkoxide such as methoxide or ethoxide to neutralize the acid catalyst from the step and to provide an alkaline reaction media having a pH or about 10-12. The reaction mixture is distilled through a fractionation column, until the overhead temperature reaches about 130° C., the approximate boiling point of the methyl isobutyl carbinol. The reaction mixture is now ready as feed for charging directly into the sodium reduction process.

A quantity of the above esterification mixture containing 150 parts of methyl isobutyl carbinol ester of saturated tallow acid is combined with 210 parts of xylene. About 60 parts of xylene and 40.5 parts of sodium, which is approximately 5% greater than the theoretical required for the charge of ester taken, is introduced into a suitably sized reaction vessel immersed in an oil bath maintained at 140-150° C. The reduction vessel is equipped with reflux apparatus, an agitator, and an inlet for introducing the alcohol-xylene mixture gradually. As soon as the sodium has melted, the stirrer is started to break up and disperese the sodium. At this point 0.5% of dilinoleic acid is added as a dispersing and emulsifying agent to the sodium-xylene mixture in the reduction vessel. Then ester is introduced at such a rate that the heat of reaction can be removed by the rapid refluxing of xylene in the reflux condenser. The reaction mixture is stirred at 130-140° C. for a short period after the addition of the ester containing mixture has been completed.

The reaction mixture is hydrolyzed by pouring it into excess hot water. Steam is introduced to distill out xylene and reducing alcohol. The product alcohol is washed twice with N/10 NaOH in water. The fatty alcohol product is then vaculm distilled. Distilled fatty alcohol recovered is 99.2 parts or a 91% yield. Non-volatile residue remaining in distillation flask is about 2 parts.

*Example II*

The production of methyl isobutyl carbinol esters from a typical low grade fatty acid glyceride is effected as follows:

1018 parts (3.2 ester equivalents) of "low grade" glyceride containing 720 parts glycerol trioleate, 180 parts oleic acid, and 18 parts of glycerol is used. This mixture typifies approximately a 20% hydrolyzed fat, an example of a low grade fat.

This charge of partially hydrolyzed fat is added to a reaction vessel together with 900 parts of methanol and 9 parts of p-toluene sulfonic acid. The methanol is rapidly distilled off without permitting condensation. This wet methanol vapor is passed through a rectification column to remove water after which the dry methanol is returned to the esterification flask. This recycling of methanol is allowed to proceed for about 2 hrs. with a temperature meanwhile maintained in the esterification vessel of 100° C. At the end of this period the glycerol formed a separate phase as indicated by the phase diagram in Fig. I. This glycerol is separated by passing the mixture into a suitable centrifuge. A direct glycerol recovery of 68% is thereby effected at this stage.

The resulting methyl ester mixture containing around 30% free methanol is treated with 10 parts sodium methylate and transferred to a fractionation still where it is combined with 980 parts of methyl isobutyl carbinol. The total methanol, excess and combined, is essentially driven off when the overhead temperature reaches 130° C., the boiling point of methyl isobutyl carbinol. This reaction mixture residue consists of 1230 parts of methyl isobutyl carbinol esters of oleic acid and 612 parts of the free carbinol or a ratio of 1 mole of ester to 2 of reducing alcohols. This is the feed stock for sodium reduction reaction without further treatment. The sodium requirement for this quantity of ester (3.2 equivalents of ester) (with a 5% excess) is (3.2×4×23×1.05 excess) or 310 parts.

*Example III*

A portion, 150 parts, of the methyl isobutyl carbinol ester of saturated tallow acids as prepared in Example II is combined with 210 parts of xylene. About 60 parts of xylene and 40.5 parts of sodium, which is 5% greater than the theoretical required for the charge of ester taken, are introduced into a reaction flask immersed in an oil bath maintained at 140-150° C. The reduction flask is equipped with reflux apparatus, an agitator and an inlet for introducing the alcohol-xylene mixture gradually into the reaction flask.

As soon as the sodium has melted, the stirrer is started to disperse sodium. At this point, a minor amount (about 0.5-0.6%) of dilinoleic acid is added to the sodium-xylene mixture in the reduction vessel. Then ester is introduced at such a rate that the heat of reaction is removed by the rapid refluxing of xylene in the reflux condenser. The reaction mixture is stirred at 130-140° C. for a short period after the addition of the ester has been completed.

The reaction mixture is hydrolyzed by pouring it into an excess of hot water. Steam is used to distill out xylene and reducing alcohol. The product fatty alcohol layer is separated and washed twice with N/10 NaOH in water. The fatty alcohol product is then vacuum distilled, giving 99.2 parts of distillate or 91% yield.

*Example IV*

In another experiment, similar to Example III, above, 150 parts of ester of saturated tallow acids are reduced with 40.5 parts sodium. No auxiliary dispersing agent is added. The yield of fatty alcohol isolated by vacuum distillation was 89.5 parts or 82%. The non-volatile residue was 6.5 parts.

*Example V*

About 150 parts methyl isobutyl carbinol ester of hardened tallow fatty acids, having a saponification value of 152.3 is combined with 90 parts of methyl isobutyl carbinol for reducing alcohol in the sodium reduction step. This mixture is further diluted with an approximately equal volume of xylene. The sodium, 40.5 parts, representing a 5% excess over that required according to the balanced reduction equation, is introduced into a reaction vessel immersed in a heated oil bath and equipped with a paddle type stirrer for agitation. A small additional amount of xylene, about 50 parts, is introduced into the vessel along with the sodium.

The oil bath is brought to the temperature of the boiling point of xylene (130-140° C.), to melt the sodium. The agitator is then started to disperse the sodium after which the reducing alcohol mixture is introduced semi-continuously into the reaction vessel. Heat generated by the sodium reduction reaction causes the xylene to reflux vigorously and the rate of addition of ester is controlled according to the capacity of the equipment to remove this reaction heat. A short additional reaction time is allowed after all ester mixture had been added.

The resulting reaction mixture is now ready for hydrolysis. A hydrolysis vessel is provided equipped with a condenser, an inlet entering below the level of the water contained therein, an inlet for steam and a bottom outlet for decanting the aqueous phase. Around 400 parts of water is introduced in this hydrolysis vessel and heated to vigorous boiling with steam. Then, the reduction reaction product, while still hot, is cautiously added to this boiling water. Hydrolysis is rapid and is completed within a few minutes. At this point the steam is stopped and the aqueous caustic soda phase (15-17% NaOH) is allowed to separate after which it is removed. The xylene and regenerated reducing alcohol are steam distilled from the mixture. When the overhead temperature reaches 90-120° C., indicating substantially complete removal of solvent and reducing alcohol, the fatty alcohol product remaining is washed twice with portions of N/10 caustic soda solution to remove suspended droplets of much stronger caustic soda and to eliminate a portion of the by-product fatty acid soaps which form in minor amounts through side reactions.

In the accompanying Table I, a series of experiments is presented showing the effect of washing with various concentrations of dilute alkali and with distilled water on emulsion formation.

TABLE I

| Run No. | Solvent | Normality of Wash Water (NaOH) | Alcohol (Av.) | Remarks |
| --- | --- | --- | --- | --- |
| I | Toluene | N/10 | C-18 Saturated | No emulsion with repeated washings. |
| | | N/100 | do | Mild emulsion, slow to break. |
| | | N/1,000 | do | Very stable emulsion: will not break spontaneously. |
| | | N/1 | C-18 (Iodine No. 31.2) | No emulsion. Sharp separation. |
| | | N/10 | do | Slight milky appearance of wash. |
| | | N/100 | do | Very stable emulsion formed. |
| | | N/1 | C-10 and C-14 Saturated | No emulsion formation. |
| | | N/10 | do | Slight milky appearance in wash water. |
| | | N/100 | do | Very stable emulsion. Breaks only on prolonged standing and then not completely. |

*Example VI*

In Table II a set of comparative data is presented to show the improvement in yield and decrease in nonvolatile distillation residue when the improved isolation technique is used. Distillation residues were relatively high in runs III, IV and V and in run IV, both high ester and acid number values were obtained, indicating poor quality fatty alcohol product.

holysis reactor 3, wherein the mixture is neutralized, with an alkali metal alkoxide, desirably in dry form, such as sodium methoxide or sodium ethoxide. This alkali is provided in an amount to produce an alkaline solution. There is then added sufficient reducing alcohol, methyl isobutyl carbinol to convert the methyl esters of the fatty acids to the corresponding methyl isobutyl carbinol esters. There is further provided 2 moles of methyl isobutyl carbinol per mole of ester in excess of that necessary to produce the ester. For this alcoholysis reaction, an alkaline environment is preferred. From this reacting mixture there is removed a volatile fraction by vaporization which is passed into fractionating column 4 from which methanol is separated and returned to storage for continuous preparation of the methyl esters. Any bottom materials is separated and either returned to the system or removed therefrom. The temperature and time is adjusted and controlled sufficiently to permit the methyl esters to be

TABLE II

| Run No. | Solvent | Higher Alcohol | | Distillation Residue, Parts | Ester No. Higher Alcohol, Mg. KOH/gm. | Acid No. Higher Alcohol, Mg. KOH/gm. | Remarks |
| --- | --- | --- | --- | --- | --- | --- | --- |
| | | Parts | Percent | | | | |
| I | Toluene | 103.3 | 95.7 | 3.8 | 0.087 | 0.009 | Product alcohols washed twice with N/10 aqueous NaOH after removal of main by-product caustic soda (17% NaOH). |
| II | do | 100.0 | 91.5 | 4.8 | 0.097 | 0.007 | Product higher alcohols washed twice with N/10 NaOH solution after separating main by-product caustic soda phase. |
| III | do | 89.5 | 82 | 6.5 | | | Hydrolysis mixture formed very stable emulsion upon washing with distilled water. Broken by complete acidification. |
| IV | Xylene | 100 | 91.5 | 9.0 | 3.51 | 1.32 | Hydrolysis mixture formed stable emulsion upon washing with water. Acidification necessary to free higher alcohols from emulsion. |
| V | do | 96 | 88 | 9.1 | 0.52 | 0.19 | Emulsion broken by addition of a large portion of methyl isobutyl carbinol (equal in amount to fatty alcohol). |

*Example VII*

Figure 3:
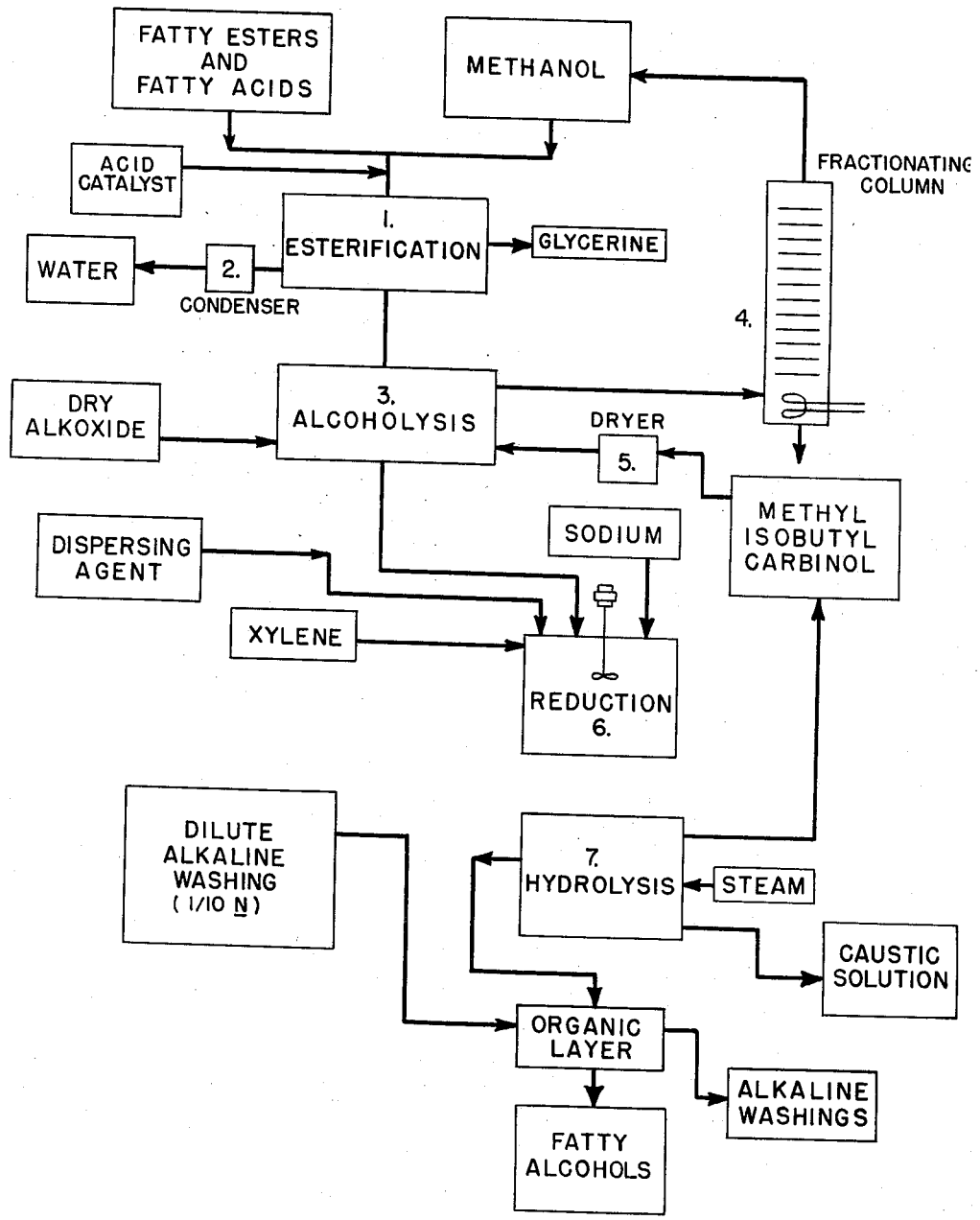

A schematic flow chart for continuous or semi-continuous operation is shown in the accompanying Figure 3. The methyl esters of the fatty acids from a low grade fat product containing free fatty acids are continuously prepared in esterification reactor 1. Strong acid such as sulfuric acid is added in minor amount (0.1% to 2.0%) as catalyst. The low grade fatty esters containing some fatty acids which are starting materials are introduced into the esterification reactor 1, either continuously or at least semi-continuously. Methanol in excess is introduced into the esterification reactor, preferably by rapid addition of methanol vapor in excess, whereby the water resulting as by-product of the esterification reaction is removed from the esterification zone by the sweep of the methanol vapor. The mixture so removed is condensed in a suitable fashion as in condenser 2 and the water so separated. If desired, the mixture can be distilled, with the water discarded and the methanol recycled. The glycerine produced from the fatty esters is recovered from this esterification zone.

The methyl esters produced are next passed to alcoconverted substantially completely to the esters of methyl isobutyl carbinol. The resulting reaction mixture will consist of the methyl isobutyl carbinol esters in a diluent mixture of two moles of the reducing alcohol per mole of esters. This mixture is passed into reduction reactor 6 which is provided with suitable agitation means.

The sodium metal in a molten state is added to reduction reactor 6 at least intermittently. A hydrocarbon diluent such as xylene is added to reactor 6. Thus, a reacting mixture containing molten dispersed sodium in hydrocarbon diluent is continuously maintained in reactor 6. The sodium (about 4 equivalents added per equivalent of methyl isobutyl carbinol ester present) is maintained in a dispersed condition and above its melting point in the mixture. The mixture is agitated with a suitable mixer. The reducing alcohol and the ester in a mixture in the proportions of 2 equivalents of alcohol per equivalent of ester as prepared in alcoholysis vessel 3 are added at least intermittently to reaction vessel 6. A dispersing agent such as dilinoleic acid is added in minor amount to vessel 6 to produce and maintain proper dispersion for the sodium.

The continuous or semi-continuous addition of the reducible mixture and the sodium is controlled at a rate such that the resulting heat can be removed to maintain the temperature of the reacting fluid mass in the range of about 140° C. to 185° C. or at reflux temperature. At least intermittently a portion of the reduction reaction mixture is transferred into hydrolyzer 7. Herein, the mixture is continuously contacted with steam and water to produce sodium hydroxide together with free fatty alcohols and regenerate the methyl isobutyl carbinol reducing alcohol from the resulting mixture, the regenerated reducing alcohol is removed, for instance, by vaporization, condensed and returned to storage and for reuse in the alcoholysis after passage through drier 5. Higher fatty alcohols are separated from hydrolysis zone 7 as product and by-product caustic soda solution is also recovered therefrom. The organic layer consisting substantially of the fatty alcohols is contacted at least once with $\frac{1}{10}$ N aqueous alkali wash liquid and the washed fatty alcohols recovered and further treated and/or purified as desired.

What is claimed is:

1. A process for preparation of fatty alcohols by sodium reduction of a mixture of esters of fatty acids having from 6 to 22 carbon atoms per molecule and free fatty acids having from 6 to 22 carbon atoms per molecule which comprises treating said mixture with a reducing alcohol having at least 4 carbon atoms per molecule in an amount such that all acids and esters are completely converted to esters of the reducing alcohol and such that an excess of reducing alcohol in the ratio of one mole of ester to two moles of reducing alcohol remains therein, directly treating said mixture of esters and reducing alcohol with finely dispersed sodium in the ratio of one mole of ester to four moles of sodium in the presence of a minor amount of dispersing agent, hydrolyzing the resulting reaction mixture and isolating fatty alcohols from said hydrolyzed reaction mixture and washing said fatty alcohols at least once with a .01 N to 1 N aqueous caustic soda solution.

2. A process according to that described in claim 1 in which the reducing alcohol is methyl isobutyl carbinol.

3. A process for preparation of fatty alcohols by sodium reduction of low grade glycerides containing a substantial proportion of free fatty acids which comprises treating said glycerides and free fatty acids contained therein with a reducing alcohol having at least 4 carbon atoms per molecule in an amount such that all acids and esters are completely converted to esters of the reducing alcohol and such that an excess of reducing alcohol in the ratio of one mole of ester to two moles of reducing alcohol remains therein, directly treating said mixture of esters and reducing alcohol with finely dispersed sodium in the ratio of one mole of ester to four moles of sodium, adding thereto about 0.5 to 1% of a dispersing agent, hydrolyzing the resulting reaction mixture and separating a fatty alcohol fraction from said hydrolyzed reaction mixture, and washing said fatty alcohol fraction at least once with a .01 N to 1 N aqueous caustic soda solution.

4. A process according to that described in claim 3 in which the reducing alcohol is methyl isobutyl carbinol.

5. A process for preparation of fatty alcohols and glycerine from mixtures of glyceride esters of fatty acids and free fatty acids which comprises hydrolyzing the glycerides to fatty acids and glycerine, recovering glycerine directly from the resulting hydrolyzed mixture, treating the total free fatty acids with a reducing alcohol having at least 4 carbon atoms per molecule in the presence of an alkaline agent and in an amount such that all fatty acids present are completely converted to esters of the reducing alcohol and such that an excess of reducing alcohol in the ratio of one mole of ester to two moles of reducing alcohol remains therein, directly treating said mixture of esters and reducing alcohol with finely dispersed sodium in the ratio of one mole of ester to four moles of sodium, adding thereto about 0.5 to 1% of a dispersing agent, hydrolyzing the resulting reaction mixture and separating a fatty alcohol fraction from said hydrolyzed reaction mixture, and washing said fatty alcohol fraction at least once with a .01 N to 1 N aqueous caustic soda solution.

6. A process according to that described in claim 5 in which the reducing alcohol is methyl isobutyl carbinol.

7. A process for preparation of fatty alcohols by sodium reduction of low grade glycerides containing a substantial proportion of free fatty acids which comprises treating said glycerides and free fatty acids contained therein with methyl alcohol in the presence of an acidic agent to convert all fatty acids to the methyl esters, treating said methyl esters with a reducing alcohol having at least 4 carbon atoms per molecule in the presence of an alkaline agent in an amount such that all esters are converted to esters of the reducing alcohol and such that an excess of reducing alcohol in the ratio of one mole of ester to two moles of reducing alcohol remains therein, directly treating said mixture of esters and reducing alcohol with finely dispersed sodium in the ratio of one mole of ester to four moles of sodium, adding thereto about 0.5 to 1% of a dispersing agent, hydrolyzing the resulting reaction mixture and separating a fatty alcohol fraction from said hydrolyzed reaction mixture, and washing said fatty alcohol fraction at least once with a .01 N to 1 N aqueous caustic soda solution.

8. A process according to that described in claim 7 in which the reducing alcohol is methyl isobutyl carbinol.

9. The process of claim 3 wherein said dispersing agent is dilinoleic acid.

References Cited in the file of this patent

UNITED STATES PATENTS

| | | |
|---|---|---|
| 2,460,969 | Blinoff | Feb. 8, 1949 |
| 2,563,044 | Kamlet | Aug. 7, 1951 |
| 2,579,257 | Hansley et al. | Dec. 18, 1951 |
| 2,719,858 | Hill | Oct. 4, 1955 |
| 2,748,175 | Wilson | May 29, 1956 |

FOREIGN PATENTS

| | | |
|---|---|---|
| 589,380 | Great Britain | June 18, 1947 |
| 1,061,101 | France | Nov. 25, 1953 |
| 1,061,102 | France | Nov. 25, 1953 |

OTHER REFERENCES

Hansley: Ind. Eng. Chem., vol. 39 (1947); pages 55–62.

Lucas et al.: "Principles and Practice in Organic Chemistry," Wiley, New York, 1949, page 79.

Miner et al.: Glycerol, Reinhold, N. Y., 1953; pp. 54, 74–6.

Hill et al.: Ibid., vol. 46 (September 1954), pages 1917–21.